United States Patent [19]
Hardin et al.

[11] 3,813,929
[45] June 4, 1974

[54] RESONANT FOOTING TEST APPARATUS

[75] Inventors: Bobby O. Hardin; Woodrow W. Thurman, both of Lexington, Ky.

[73] Assignee: The University of Kentucky Research Foundation, Lexington, Ky.

[22] Filed: Mar. 27, 1973

[21] Appl. No.: 345,259

[52] U.S. Cl............................ 73/84, 73/94, 73/99, 73/101
[51] Int. Cl........................... G01h 1/10, G01n 3/22
[58] Field of Search........ 73/67.2, 84, 94, 101, 67.1

[56] References Cited
UNITED STATES PATENTS
3,362,216  1/1968  Hardin et al............................ 73/94
3,643,498  2/1972  Hardin................................ 73/101

Primary Examiner—Richard C. Queisser
Assistant Examiner—John P. Beauchamp
Attorney, Agent, or Firm—William E. Sherwood

[57] ABSTRACT

An apparatus for conducting resonant footing tests upon undisturbed soils includes an oscillatable mechanical structure with attachable electrical means for causing both oscillation of the structure and measurement of the behavior of the soil under test. The apparatus is transportable to the site at which the test is conducted on soil in-situ, and is adapted to be employed under selective loadings applied downwardly upon the oscillatable structure.

5 Claims, 5 Drawing Figures

3,813,929

RESONANT FOOTING TEST APPARATUS

BACKGROUND OF THE INVENTION

Determination of the shear-modulus of a given soil is often a prerequisite to the designing of civil engineering or construction projects, and apparatus for use in certain types of such determinations is disclosed in the patents to Hardin et al. No. 3,362,216 and Hardin No. 3,643,498. However, apparatus as disclosed therein is usually of a compact form requiring careful assembly and manufacturing techniques with commensurate cost, and, moreover, is not suited for the testing in-situ of an undisturbed soil layer. Analytical design techniques providing for the determination of shear-modulus values, based upon the vibration of an elastic half space of soil in-situ with measurements of the resonant frequency of a torsionally vibrating circular footing placed on that half space, are available. The present invention, therefore, is directed to making available to the designer a resonant footing test apparatus with which these measurements may be obtained in a simple, accurate and rapid manner, and without having to make allowances for errors which would be attributable to the testing of a sample removed from the site.

SUMMARY

The resonant footing test apparatus of the present invention employs a mechanical oscillator structure with means for applying selected downwardly directed loadings thereon. The structure includes a central footing member having ground-engaging blades and a framework surrounding the footing member and attached thereto by spokes which are flexible in a horizontal plane. An arm attached to the footing member extends into proximity with the framework and a coil and magnet assembly is interposed between the distal end of the arm and the framework. A seismic pickup carried by the arm signals the displacement of the footing member when electrical current is supplied to the coil.

Among the objects of the invention are the provision of an improved reasonant footing test apparatus for conducting soil tests-in-situ and which avoids errors due to working with disturbed soil samples; the provision of a footing test apparatus with which shear-modulus values of soil under selected loadings may be rapidly determined; the provision of a heavy-duty, comparatively simple and inexpensive footing test apparatus; and the provision of a transportable footing test apparatus which may be installed in testing position with a reduced amount of labor.

These and other objects and advantages of the invention will become more apparent as the desription proceeds and when considered in conjunction with the accompanying drawings in which FIG. 1 is a perspective view indicating the testing equipment and associated structure in readiness for conducting a field test.

Figure 1:
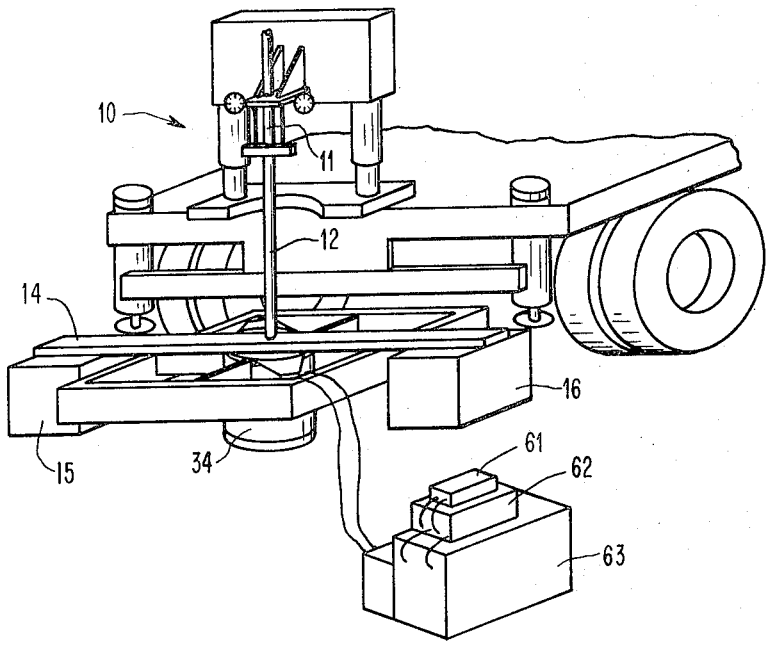
Figure 2:
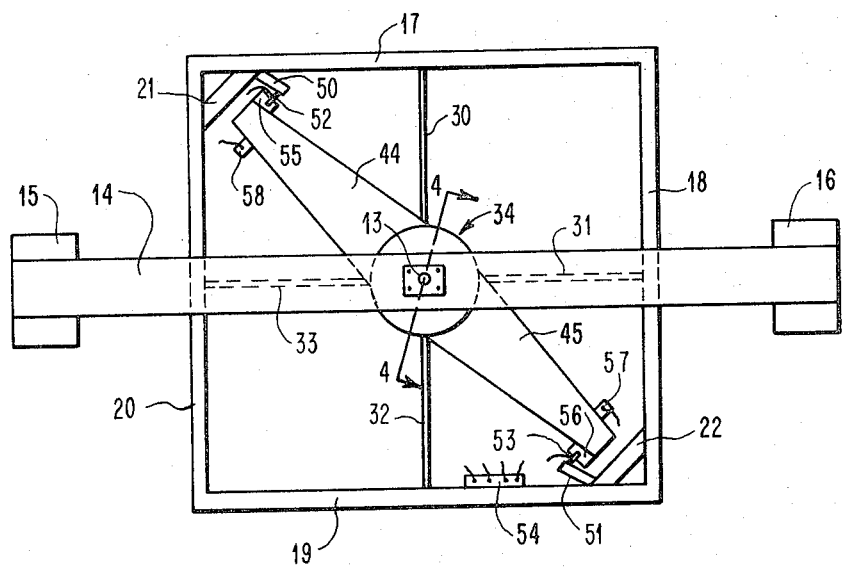
FIG. 2 is a plan view of the field oscillator structure.

Referring first to FIG. 1, in contrast to conventional resonant testing equipment disposed in holes beneath the ground surface or used with core samples in a laboratory, the present invention involves the use of a sturdy mechanical oscillator structure which may be readily transported to a field site with a vehicular apparatus and be connected to such vehicular apparatus during the conduct of a test. A vehicular drill rig 10 adapted for other usages, but having a load cell 11 and a hydraulic system for supplying an axial loading on the footing provides a support in the field for a rigid generally vertically disposed rod 12. At its lower end the rod is engageable in a ball joint 13 with a horizontal beam 14 forming a part of a comparatively massive framework, and to enhance this mass weights such as 15, 16 are supported at the ends of the beam. Since the oscillator is to function in an unobstructed area above the ground and since a substantial leverage is to be exerted upon the central footing member later to be described, the weights may be spaced an appreciable distance apart, for example about nine feet, and located outboard of the framework.

Inboard of the weights a polygonal or round framework, here shown as square with sides 17, 18, 19 and 20, is rigidly supported beneath and attached to the beam and is provided with rigid cross braces 21, 22 at two of its interior corners. Rigidly attached at one end to the interior faces of the framework is a series of symmetrically spaced equal length spokes 30, 31, 32 and 33 which are rigidly attached at their other ends to the central member 34 which is to be oscillated during the conduct of the test. These spokes preferably are in the form of leaf springs which flex torsionally in a horizontal plane, but which are rigid vertically. Moreover, in comparison with the masses of the apparatus to which the spokes are attached they are essentially weightless.

Figure 3:
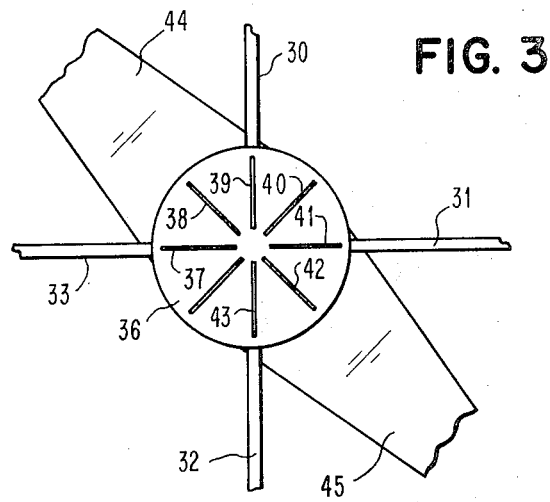
FIG. 3 is a bottom face view of the ground-engaging member.
Figure 4:
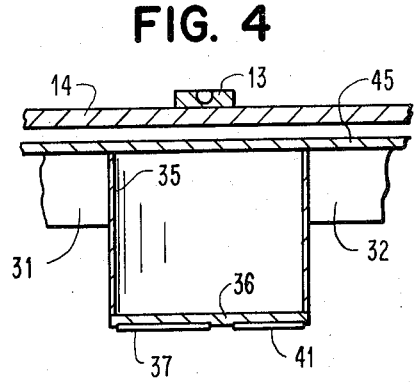
FIG. 4 is a sectional view of the ground-engaging member to a larger scale and taken on line 4—4 of FIG. 2.

As best seen in FIGS. 3 and 4, the ground-engaging footing member may be constructed of a tubular portion 33 to the bottom of which a round disc 36 is rigidly but detachably secured. This disc on its lower face has a plurality of symmetrically arranged radial slots into which corresponding thin blades, such as shown at 37 to 43, are securely affixed, and with their lower edges projecting far enough, for example about three-eighths inch below the disc to provide a firm coupling with the ground. Rigidly attached to the portion 35 at its opposite end is an elongated member having symmetrical arms 44, 45 with their distal ends extending to adjacent the braces 21, 22 of the framework. For the purpose of applying a forcing torque on the surface of the half space of the ground under test, a conventional coil and permanent magnet assembly is employed to produce this torque electromagnetically. Since space limitations are no problem, as contrasted with the structure disclosed in the afore-mentioned patents, an inexpensive and easily maintained coil and magnet assembly may thus be employed.

For example, a pair of posts 50, 51 may be mounted on the braces 21, 22 and support laterally a pair of cylindrical coils 52, 53, respectively, with these coils being connected in series by means of conductors extending from a terminal board 54 mounted on the framework. Cooperatively mounted on one side of the distal ends of arms 44, 45 are hollow cylindrical permanent magnets 55, 56 within which the coils are adapted to move when an electrical current, which varies sinusoidally with time and which current is adapted to be supplied at selected and variable frequencies, is supplied to the coils.

On the opposite sides of the distal ends of one or both of the arms a conventional seismic pick-up means is mounted and by means of a conductor extending to the terminal board provides a signal for the measurement of the movement of the vibrating feeting in contact with the soil under test. Preferably this pick-up means comprises velocity transducers 57, 58 connected in series although only one such transducer may be employed without departing from the invention. Also, if preferred, an accelerometer type of pick-up may be employed in lieu of the velocity transducer.

As will be apparent, the framework and attached beam 14 and weights 15, 16 have such a large rotational inertia, as compared with the footing member and its arms, that essentially a fixed reaction is provided against which the forcing torque of the coils and magnets will react. Accordingly, upon application of this torque the footing member and the half space of soil upon which it presses will oscillate while the framework will remain stationary. Moreover, this relationship is not disturbed as variable loadings are applied by pressures directed downwardly by rod 18.

In general, reliable data may be obtained when the loadings measured on the load cell range from 5 psi to 50 psi and when applied to footing member plates 36 having from 1 square inch to 100 square inches of ground-engaging surfaces. It is contemplated that a range of plates 36 with different ground-engaging surfaces and carry different lengths of blades may be secured to the housing 35 when desired, and without further modification of the mechanical oscillator structure.

The described apparatus will normally be transported to the work site with the electrical source detached from the terminal board and with rod 12 detached from the load cell. Upon arrival at the work site a small area of ground surface is leveled, and is cleared of unrepresentative soil, but not otherwise disturbed, and the footing member is placed thereon. The rod 12 is then connected to the load cell and the entire weight of the mechanical oscillator structure is permitted to rest on the footing member; it being apparent that any deviation between the planes in which the footing member and the drill rig wheels are resting will be accomodated by the ball joint 13. The hydraulic system of the drill rig is then connected to the load cell in readiness for application of loadings to the footing member.

Figure 5:
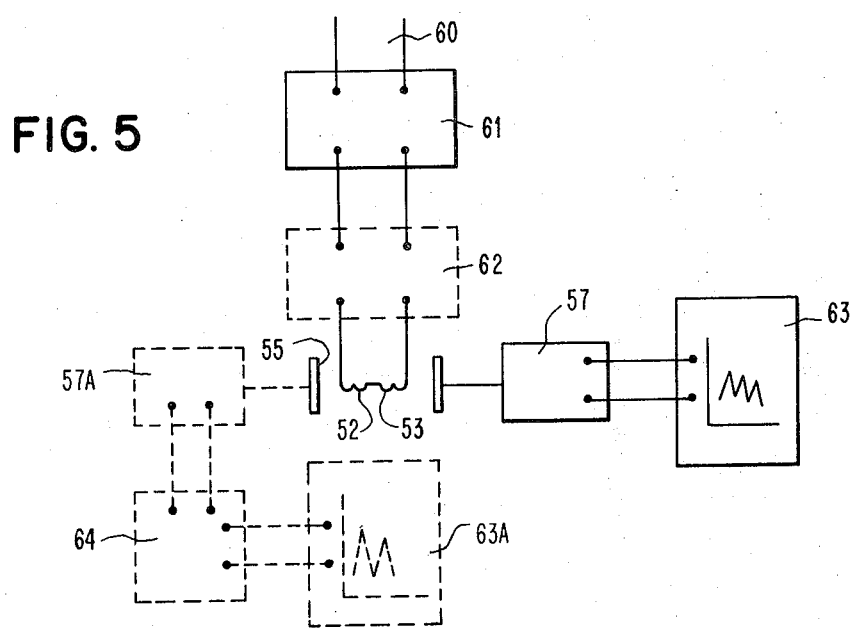
FIG. 5 is a diagrammatic view indicating the relationship of suitable electrical equipment with respect to mechanical portions of the apparatus when conducting an in-situ soil test.

Referring now to FIG. 5, a source of alternating current 60 which may be a small internal combustion engine driven generator (not shown) serves a conventional signal generator 61 which may be an adjustable frequency type HP200AB oscillator and which in turn is then connected at the site to the terminal board 54 and thence to coils 52, 53. If desired, an amplifier 62 may be employed in this circuit.

The reaction of the current flow in the coils upon the permanent magnets causes oscillation of the arms 44, 45 to occur and to be transmitted with leverage upon the footing member which is coupled to the ground half space by means of the blades. The movement of the arms provides a signal from the seismic pick-up velocity transducers 57, 58 which then is read on a conventional X-Y oscilloscope 63 and such reading is used to detect resonance of the footing soil system. The frequency of oscillation corresponding to this resonance is then read from the signal generator 61 and recorded for use in the analytical design formulas to be used in determining the shear-modulus of the soil under those particular test conditions.

Alternately, the movement of the arms may be reflected by a conventional accelerometer 57A connected through a charge amplifier 64 and which signal is then similarly read on the oscilloscope 63A.

As will be understood, in the conduct of tests upon the soil a number of such tests are made at differing loadings on the footing member before the apparatus is moved to another in-situ testing site. If such subsequent site is relatively close to the first site and movement can be made without substantial shock to the equipment, the electrical equipment may be moved by hand and the mechanical oscillator structure moved by the vehicle 10 without detachment of the rod 12 from the load cell structure.

Having thus described a preferred form of apparatus for conducting resonant footing tests in the field, it will be understood that the invention may be embodied in other forms than that described as being the preferred form.

What is claimed is:

1. A field resonant footing test apparatus comprising a mechanical oscillator structure, means for selectively applying a downwardly directed loading upon said structure; said structure including a centrally disposed footing member having radially extending ground-engaging blades on its lower face, a framework in surrounding relation to said member and joined thereto by a plurality of supporting spokes flexible in a horizontal plane, said member having an arm extending into proximity to said framework, a coil amd magnet assembly interposed between the distal end of said arm and said framework; means for applying a forcing torque to said coil and magnet assembly, and means for measuring the movement of said footing member with said blades coupled with the ground and during the application of said loading and said torque.

2. Footing test apparatus as defined in claim 1 wherein said mechanical oscillator structure includes a beam extending transversely of said framework and rigidly attached thereto, said means for applying the loading including a rod joined to said beam by a ball joint.

3. Footing test apparatus as defined in claim 2 including weights carried by said beam adjacent the ends thereof and located outboard of said framework.

4. Footing test apparatus as defined in claim 1 wherein said arm is attached adjacent its center to said footing member and has two distal ends in proximity to said framework with coil and magnet assemblies being interposed between each of said distal ends and said framework.

5. Footing test apparatus as defined in claim 1 wherein said means for measuring the movement of said footing member includes a seismic pickup unit mounted on said arm adjacent said coil and magnet assembly.

* * * * *